US010943425B2

(12) United States Patent
Olmstead et al.

(10) Patent No.: US 10,943,425 B2
(45) Date of Patent: Mar. 9, 2021

(54) DEVICE AND SYSTEM FOR HIGH-SPEED BOTTOM SCANNING OF BARCODES

(71) Applicant: Datalogic USA, Inc., Eugene, OR (US)

(72) Inventors: Bryan L. Olmstead, Eugene, OR (US); Mark Schmidt, Eugene, OR (US)

(73) Assignee: DATALOGIC USA, Inc., Eugene, OR (US)

(*) Notice: Subject to any disclaimer, the term of this patent is extended or adjusted under 35 U.S.C. 154(b) by 252 days.

(21) Appl. No.: 16/081,750

(22) PCT Filed: Mar. 3, 2017

(86) PCT No.: PCT/US2017/020580
§ 371 (c)(1),
(2) Date: Aug. 31, 2018

(87) PCT Pub. No.: WO2017/152004
PCT Pub. Date: Sep. 8, 2017

(65) Prior Publication Data
US 2020/0273282 A1 Aug. 27, 2020

Related U.S. Application Data

(60) Provisional application No. 62/303,569, filed on Mar. 4, 2016.

(51) Int. Cl.
G06K 7/10 (2006.01)
G07F 7/06 (2006.01)

(52) U.S. Cl.
CPC ....... G07F 7/0609 (2013.01); G06K 7/10722 (2013.01); G06K 7/10871 (2013.01)

(58) Field of Classification Search
CPC .......... G07F 7/0609; G06K 7/10722; G06K 7/10871
(Continued)

(56) References Cited

U.S. PATENT DOCUMENTS 6,457,642 B1* 10/2002 Good ................. G06K 7/10 235/462.01
7,632,367 B2 12/2009 Smith
(Continued)

FOREIGN PATENT DOCUMENTS

DE 10063369 A1 6/2002
EP 0924659 A1 6/1999
(Continued)

OTHER PUBLICATIONS

International Preliminary Report on Patentability dated Sep. 13, 2018 in International Patent Application No. PCT/US2017/020580, 8 pages.
(Continued)

Primary Examiner — Karl D Frech
(74) Attorney, Agent, or Firm — Shook, Hardy & Bacon, LLP

(57) ABSTRACT

An improvement is made to a funnel used in connection with a conveyor belt to increase the scanning speed of barcodes on items moving through the funnel and onto the conveyor belt. The funnel includes a funnel protrusion that provides mechanical support and optical access to a bottom-facing barcode on the container. The increased field of view for the barcode created by the funnel protrusion allows for increased scanning speed. Further, a camera system may be used with the funnel to increase scanning speed. The camera system may include a plurality of cameras and a plurality of mirrors to obtain multiple perspectives of the container and provide different images for faster processing.

29 Claims, 12 Drawing Sheets

(58) Field of Classification Search
USPC .......................................................... 235/454
See application file for complete search history.

(56) References Cited

U.S. PATENT DOCUMENTS

| | | |
|---|---|---|
| 8,489,232 B2 | 7/2013 | Mishra et al. |
| 2001/0052445 A1 | 12/2001 | Coyne et al. |
| 2008/0277323 A1 | 11/2008 | Stovring |
| 2009/0134221 A1* | 5/2009 | Zhu ...................... G07G 1/0054 235/383 |
| 2012/0187195 A1* | 7/2012 | Actis .................... G07G 1/0045 235/479 |
| 2014/0147005 A1 | 5/2014 | Kavli et al. |

FOREIGN PATENT DOCUMENTS

| | | |
|---|---|---|
| EP | 1953674 A1 | 6/2008 |
| WO | 2009021515 | 2/2009 |

OTHER PUBLICATIONS

International Search Report and Written Opinion dated May 22, 2017 re PCT/US2017/020580, 10 pages.

\* cited by examiner

DEVICE AND SYSTEM FOR HIGH-SPEED BOTTOM SCANNING OF BARCODES

CROSS-REFERENCE TO RELATED APPLICATIONS

This application claims priority to PCT/US2017/020580, filed Mar. 3, 2017, entitled "Device and System for High-Speed Bottom Scanning of Barcodes", which claims the benefit of U.S. Provisional Application No. 62/303,569, entitled "Device and System for High-Speed Bottom Scanning of Barcodes" filed Mar. 4, 2016, both of which are incorporated by reference in their entireties.

BACKGROUND OF THE INVENTION

Optical codes placed on items are used to encode optically-readable information about the item. A well-known example of an optical code is a barcode. Barcodes may be placed on a variety of items to provide identification and other information about the item. A barcode comprises a series of bars and spaces of various widths, wherein the width of any particular bar or space is an integer multiple of a specific minimum width known as a "module" or "unit." The pattern of the bars and spaces provides a unique identification for a particular product. An imager-based reader uses a camera or imager to generate electronic image data of the pattern that comprises the barcode. This data is processed for decoding and product identification. FIGS. 1A and 1B illustrate a typical item, a container 100, having barcodes 110 and 120.

There are a few universally recognized barcode standards. For instance, the Universal Product Code (UPC) is a barcode standard widely used for tracking consumer goods. The most common form, the UPC-A, consists of 12 digits. The International Article Number (EAN) is another commonly used standard. The EAN-13 comprises 12 normal digits plus a thirteenth digit defined by the combination of the bar-space patterns on the left half of the barcode. The EAN-8 is similar to the EAN-13 but comprises only 8 digits. Barcodes 110 and 120 illustrated in FIGS. 1A and 1B are EAN-13 barcodes.

As shown in the figures, barcodes may be printed on an item in different orientations. For example, FIG. 1A shows a container 100 with a fence barcode 110. When the container 100 is in an upright position, the bars making up the fence barcode 110 are vertical, resembling the pickets of a fence. Because barcodes are generally read in a direction perpendicular to the bars, a fence barcode 110 oriented in the position shown in FIG. 1A would be read in a horizontal direction. Instead of a fence orientation, a barcode may be printed in a ladder orientation, as shown in FIG. 1B. When the container 100 is in an upright position, the bars of the ladder barcode 120 run horizontally, resembling the rungs of a ladder. Because the bars run horizontally, the ladder barcode 120 is read in a vertical direction.

Barcodes are commonly placed on consumer goods that are scanned by a point of sale device to identify the goods and the prices for the goods. Another use for barcodes arises in reverse vending. A reverse vending machine is a device that accepts used or otherwise empty containers, including beverage containers, and returns money to the user. These devices are prevalent in areas having mandatory recycling or container deposit laws. By scanning barcodes, reverse vending machines may be able to identify what item is being returned, whether it can be recycled, and the type of material used for the container, which may dictate where the item is ultimately transported. In addition to barcodes, other logos or labels on the container may be imaged by reverse vending machines. For example, the Deutsche Pfandsystem GmbH (DPG) logo 130 shown in FIGS. 1A-1B is printed on drink containers, like container 100, in Germany, which has a mandatory depositing scheme. Reverse vending machines used in Germany implement the mandatory depositing scheme by scanning for the DPG logo 130 to identify containers that entitle the user to a deposit return. To prevent fraud, DPG logos 130 are printed in a way so that the logo viewed under infrared light looks different than when viewed under visible light, such as a mixture of red and blue light. To authenticate a DPG logo 130, it must be viewed or imaged using infrared and visible light.

Generally, reverse vending machines image a barcode and security logos, such as the DPG logo, on a container that has been inserted into the machine and that moves onto a conveyor belt. It may be desirable for the conveyor belt to move the container quickly and, therefore, to scan the barcode quickly, to provide a more efficient process. The rate at which a barcode moving on a conveyor belt can be accurately scanned, or the sweep speed, depends on many factors, including the type of cameras used, the frame rate of the cameras, the placement of the cameras relative to the barcode, and the field of view. For example, with a smaller field of view, the container with the barcode must move at a slower rate to ensure the camera can capture the barcode within that field of view.

When a container is inserted into a reverse vending machine with the barcode facing upward, a camera oriented above the conveyor belt will have a larger field of view within which the camera can capture images of the barcode. However, if a user inserts a container into a reverse vending machine with the barcode facing down, a scanning imager above the container could not capture images of the barcode. An existing solution to this problem is to rotate the container so that the barcode is visible to the camera. Rotating the container, however, reduces the speed at which the barcodes are scanned.

Another solution is to have a camera oriented below the conveyor and a gap between a funnel and the conveyor so that the camera can capture an image of a bottom-facing barcode as the barcode passes over the gap. The gap must be wide enough to provide a large enough field of view for the camera to read the barcode. At the same time, the size of the gap must be narrow enough to ensure a smooth transition for the container between the funnel and the conveyor so that the container does not fall through the gap or otherwise get caught between the gap. This limitation is particularly present in regions where integrated bottle caps, or bottle caps that are not fully removable from the bottle, are common and for reverse vending machines that may move a container in a reverse direction to reject a particular container. The limitation on the size of the gap has created the problem illustrated by FIGS. 2A and 2B.

FIGS. 2A and 2B provide bottom views of a fence barcode 110 and a ladder barcode 120, respectively, moving between a funnel 210 and a conveyor 220 in a traditional scanning system 200. In FIG. 2A, the container 100 having a fence barcode 110 is moving in the direction shown by arrow 240 from the funnel 210, over the gap 230, and on to the conveyor 220. As the fence barcode 110 moves across the gap 230, the barcode pattern is visible through the gap 230 at one time. A camera positioned underneath the conveyor 220 and funnel 210 could be used to scan or read the fence barcode 110 through the gap 230. As illustrated in FIG. 2B, however, the gap 230 does not work for scanning a ladder barcode 120. Because barcodes are read in a direction perpendicular to the bars, the ladder barcode 120 will be read in a direction parallel to the direction of movement 240. Accordingly, the barcode pattern on the ladder barcode 120 runs parallel to the direction of movement 240 and cannot be viewed in its entirety through the gap 230 at one time because part of the pattern will be covered by either the conveyor 220 or funnel 210. Thus, the gap 230 that provided a sufficient field of view for scanning the fence barcode 110 in FIG. 2A does not work for the ladder barcode 120 in FIG. 2B.

Additionally, because smaller fields of view require slower sweep speeds to ensure an image of a moving object is captured, a narrower gap limits the sweep speed, thereby creating a less efficient process. Presently, there exists a need for a system that allows for bottom scanning of both fence barcodes and ladder barcodes at a high speed while not utilizing a large gap that risks falling or catching of the containers.

SUMMARY OF THE INVENTION

Embodiments of the invention are defined by the claims below, not this summary. A high-level overview of various aspects of embodiments of the invention is provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In brief and at high level, embodiments of the present invention provide a high speed scanning system for bottom-reading of both fence barcodes and ladder barcodes. A funnel having a funnel protrusion provides optical access to downward-facing barcodes on an item for scanning purposes while mechanically supporting the item to a conveyor belt. The funnel protrusion may be positioned adjacent to a conveyor belt with a small gap between the conveyor belt and the funnel protrusion. As an item having a barcode is passed between the funnel and the conveyor belt, it passes over the funnel protrusion and the gap. A camera may scan a downward-facing barcode through that gap and the funnel protrusion.

Embodiments of the present invention may also include a camera system having a plurality of cameras to capture images of a barcode on an item. The camera system may comprise four cameras that use a plurality of mirrors to obtain a 360-degree view around the funnel protrusion and the gap between the funnel and the conveyor belt. With this 360-degree view, the camera system be able to image and read a barcode positioned anywhere around the item. These cameras may take a number of images per frame for reading different types of barcodes and other identification measures. Images taken in visible light may be used to read barcodes, while images taken in infrared light may be used in conjunction with the visible light images to detect other identification means, such as a DPG logo.

BRIEF DESCRIPTION OF THE DRAWING

Illustrative embodiments of the present invention are described in detail below with reference to the included drawing figures, wherein.

DETAILED DESCRIPTION OF THE INVENTION

Figure 1A:
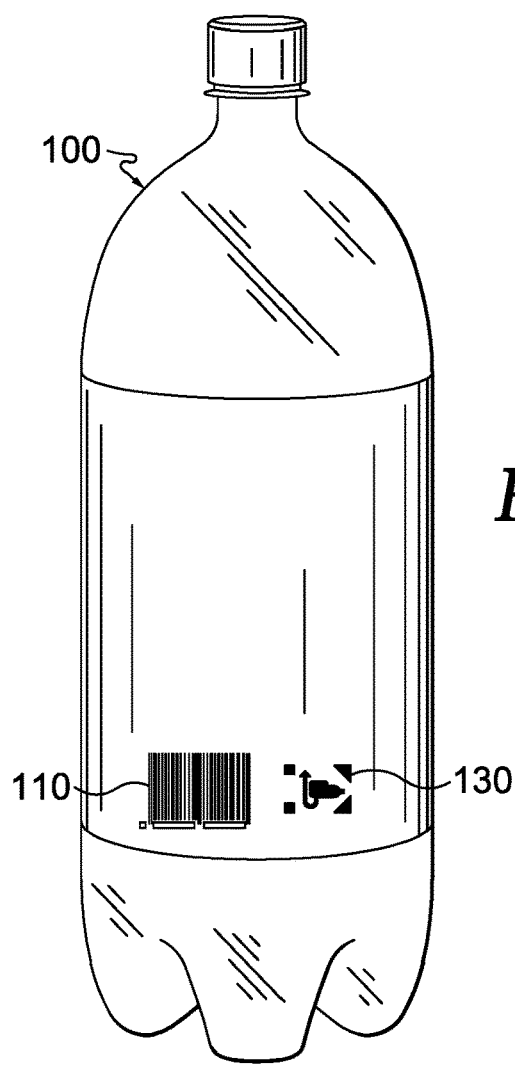
FIGS. 1A-1B are side views of a container having a fence barcode and a ladder barcode, respectively, of the prior art.
Figure 1B:
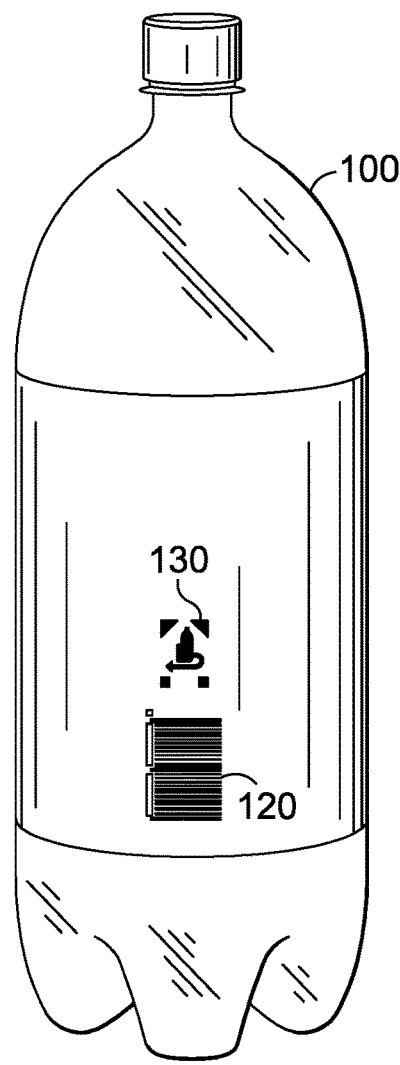

Embodiments of the present invention relate generally to a funnel used in connection with a conveyor belt to allow for scanning of bottom-facing barcodes, including ladder barcodes, at a high speed. The funnel includes a funnel protrusion that creates visual access to the bottom-facing barcodes while mechanically supporting items with barcodes that are moving from the conveyor belt to the funnel. A camera system is positioned around the funnel and conveyor belt to scan the barcodes and includes a camera with a view of the items from underneath the conveyor belt and funnel. The field of view for the camera is increased by the funnel protrusion, which allows for scanning of the barcodes at a high rate. Further, the camera system may use a plurality of mirrors, including a splitting mirror that provides separate views for a bottom-facing fence barcode and a bottom-facing ladder barcode.

In a first aspect, a device for allowing bottom scanning of barcode labels is provided. The device includes a funnel body having an annular shape with an aperture for receiving containers or other items having a barcode. The funnel body also includes a funnel protrusion extending from a bottom portion of one side of the funnel body. The funnel protrusion may be configured to carry the container with the barcode to an adjacent conveyor belt. The funnel protrusion may also be configured to provide optical access, or a view, of a barcode on the container to at least a camera positioned generally below the funnel protrusion as the container passes over the funnel protrusion. The funnel protrusion may provide optical access by being constructed with transparent material or by comprising one or more evenly spaced fingers.

In another aspect, a system for scanning barcodes, including down-ward facing barcodes, at a high speed is provided. The high-speed scanning system includes a conveyor belt for transporting containers having a barcode. The conveyor belt may receive the containers from a funnel. The funnel may comprise a funnel body having an aperture through which the containers are placed and a funnel protrusion extending along a portion of the funnel body. The funnel protrusion may extend off the side of the funnel body and towards the conveyor belt, thereby closing up some of the gap between the funnel and the conveyor belt. The funnel body may be positioned at a first distance from the end of the conveyor belt and may be a sufficient distance for reading downward-facing ladder barcodes on containers moving at a high speed over the funnel protrusion and gap between the funnel and conveyor belt. The high-speed scanning system may further include a camera system positioned to capture one or more images of the containers as they pass over the funnel protrusion toward the conveyor belt. An image processor may be provided to read or decode the barcodes from the images captured.

In yet another aspect, a method of scanning one or more barcodes on an item is provided. The method includes first receiving the item through an aperture of a funnel body. The item is then passed over a funnel protrusion and onto a conveyor belt. The funnel protrusion extends from at least a bottom portion of the funnel body and provides visual access of the item to at least a camera positioned below the conveyor belt. One or more cameras may capture a plurality of images of the container as it passes over the funnel protrusion. At least one image may include a barcode on the item, wherein the barcode was generally facing down towards the funnel protrusion.

Figure 3A:
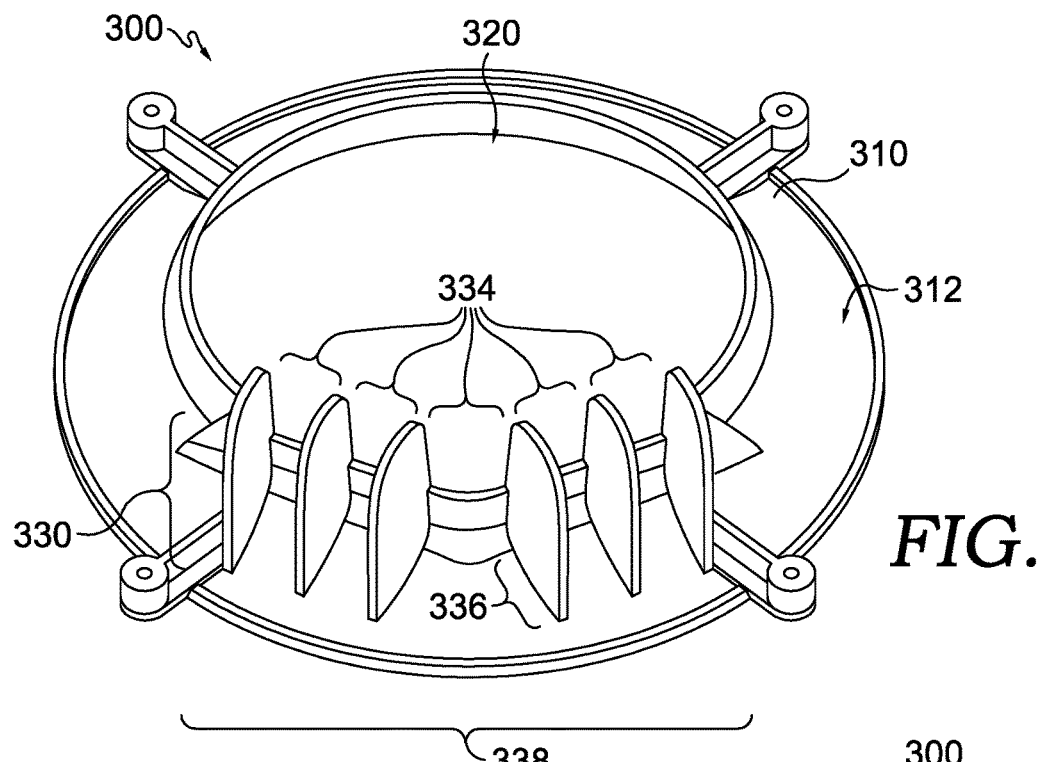
FIGS. 3A-3B are bottom perspective and side perspective views, respectively, of an exemplary funnel used in a scanning system in accordance with an embodiment of the present invention.
Figure 3B:
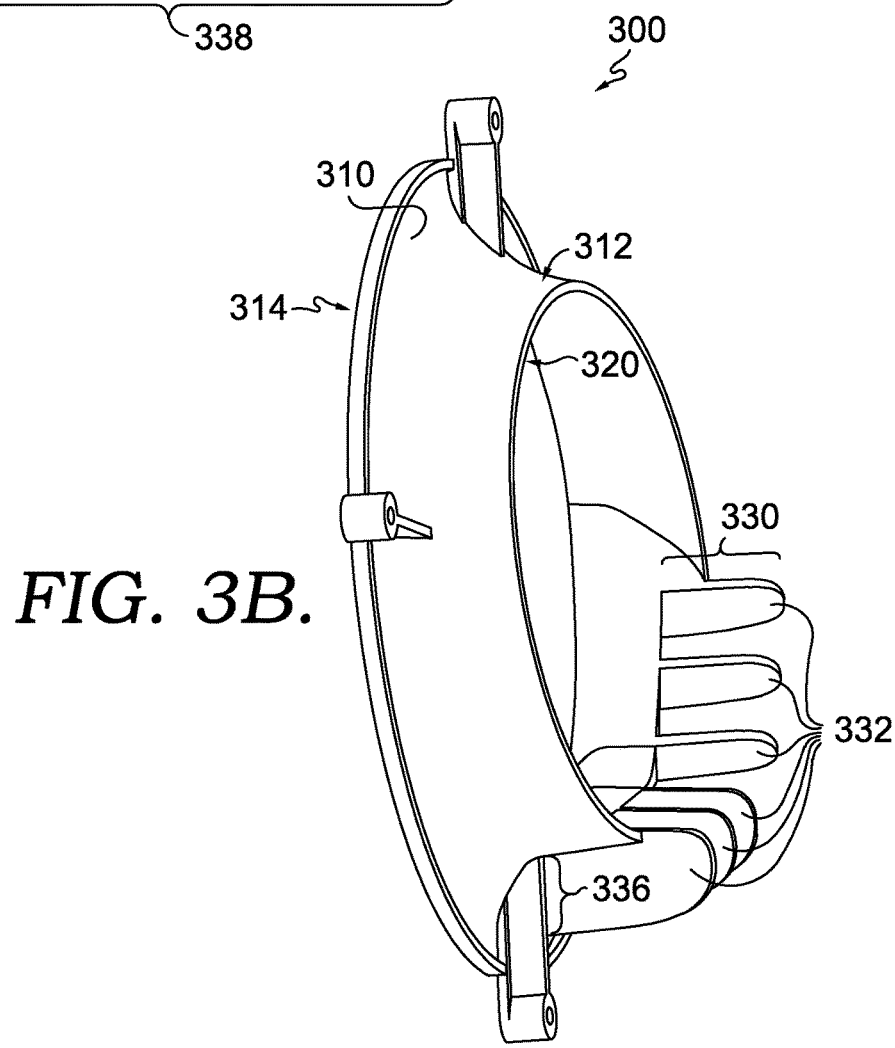

Turning to FIGS. 3A and 3B, a device is provided that allows for bottom-scanning of both fence-oriented and ladder-oriented barcodes while maintaining a high sweep speed. The device comprises a funnel 300 having a funnel body 310 with a first side 312 and a second side 314 and one or more funnel protrusions 330 extending from the first side 312 of the funnel body 310. In exemplary embodiments, the funnel body 310 is generally circular shape, as shown in FIGS. 3A and 3B, but may be other shapes, including a square, rectangle, polygon, horse-shoe shape, or any asymmetrical shape. The funnel body 310 may have an aperture 320 for receiving containers. In one embodiment, the aperture 320, like the funnel body 310, is circular but in other embodiments, the aperture 320 may be a different shape such as a square, a triangle, or a rectangle. The shape and size of the aperture 320 may generally correspond to the containers intended to move through the aperture. For example, rounded bottles and cans may be inserted through the circular-shaped aperture 320 in FIGS. 3A-3B. Additionally, the aperture 320 may have a diameter that is larger than the diameters of containers, such as bottles and cans, intended to be inserted through the aperture. The aperture 320 may be in the center of the funnel body 310 or substantially centered on the funnel body 310 such that it may be off-centered.

The first side 312 of the funnel body 310 may have one or more funnel protrusions 330 extending outward from the funnel body 310. In exemplary embodiments, the funnel protrusion 330 is positioned along at least the bottom portion of the funnel 300 or at a position underneath the aperture 320. In this way, an item placed through the aperture 320 may be supported by the funnel protrusion 330. In other embodiments, the funnel protrusion 330 may extend around the entire perimeter of the aperture 320.

Figure 4A:
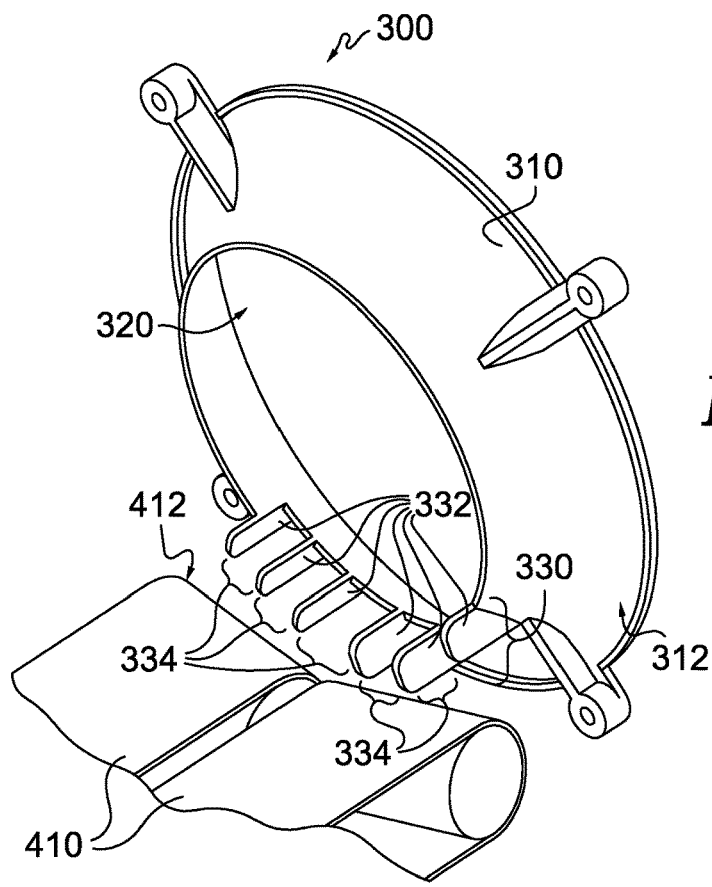
FIGS. 4A-4B are top perspective and side views, respectively, of the exemplary funnel of FIGS. 3A-3B with a conveyor belt in accordance with an embodiment of the present invention.
Figure 4B:
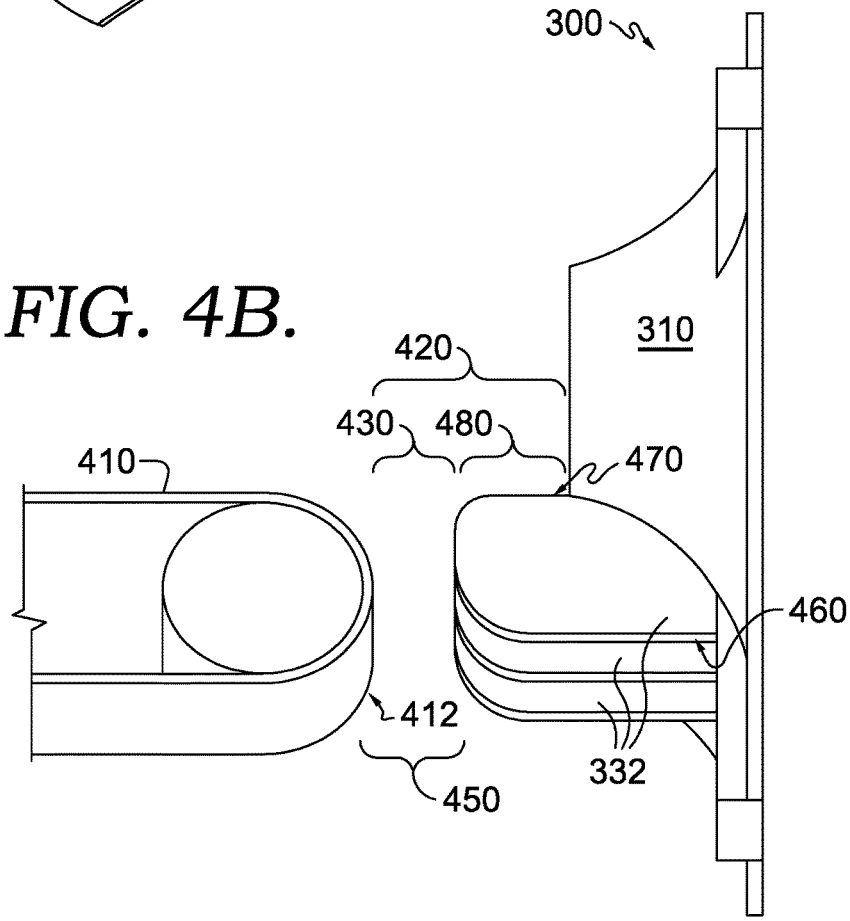
Figure 7:
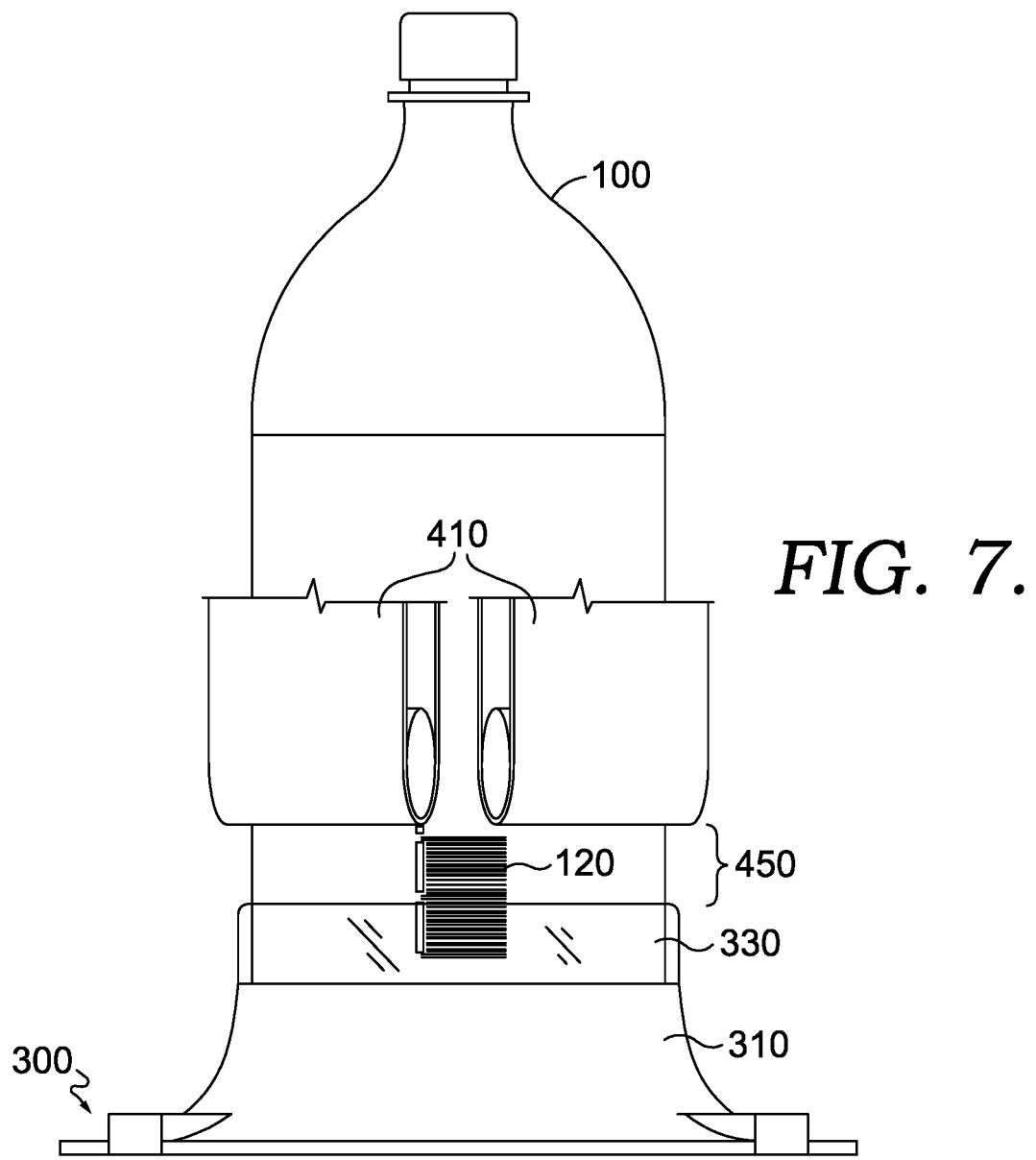
FIG. 7 is a bottom view of a container with a ladder barcode moving across the funnel having a transparent funnel protrusion in accordance with an embodiment of the present invention.

The funnel protrusion 330 is configured to mechanically support the container 100 inserted through the aperture 320 onto an adjacent surface, such as the conveyor belt 410 described with FIGS. 4A-4B, while providing a bottom view of the container 100 and any downwards-facing barcode on the container 100. For example, in one embodiment that is illustrated in FIG. 7, there may be a single funnel protrusion 330 comprising a transparent material such that a barcode is visible through the funnel protrusion 330. A suitable material for the transparent funnel protrusion 330 may include glass, plexiglass, plastic, or any other transparent and durable material.

In the exemplary embodiment shown in FIGS. 3A-3B, a funnel protrusion 330 is serrated or comprises fingers 332 evenly spaced along a bottom portion of the first side 312 of the funnel body 310. The serrations or fingers 332 provide a mechanism to support a moving container 100, while the spaces 334 between the fingers 332 provide a view of a barcode on the container 100. An advantage of using spaced fingers 332 or serrations as the funnel protrusion 330 instead of a funnel protrusion 330 with a unitary, transparent configuration is that the view of a barcode with the latter may be obstructed by buildup of dirt, debris, or residual liquid that spills out of the containers 100. By utilizing empty space 334 between the plurality fingers 332, instead of a single transparent piece, to provide a field of view of the barcode, the field of view is less likely to become obscured. To further minimize this risk, the width of the space 334 between the fingers 332 may be sufficiently great to prevent the trapping of debris. Similarly, the spaces 334 may be wide enough to prevent the fingers of someone working with the funnel 330 to become caught. Alternative funnel protrusions 330 include a generally rectangular-shaped piece with two gaps running parallel to the direction of movement that are positioned near the edges of the funnel protrusion 330 and a triangular shaped piece attached to the funnel body 310 such that the funnel protrusion 330 narrows as it extends towards the middle of one end of the conveyor belt.

The fingers 332 may be constructed from a variety of materials. In exemplary aspects, the fingers 332 are thin pieces of plastic. Using thin fingers 332 minimizes the area of the barcode that may be blocked by the fingers. The fingers 332 may further be positioned with respect to a camera such that the fingers 332 are nearly invisible to the camera. At the same time, the fingers 332 may be of sufficient depth 336 to securely attach to the funnel body 310. For example, the fingers 332 in FIGS. 3A-3B are attached to the funnel body 310 along a side of the fingers 332 corresponding to depth 336. A greater depth 336 allows for more attachment between the funnel body 310 and the fingers 332, adding stability and strength to the fingers 332. Alternatively, the fingers may comprise metal or plastic rods or metal wires extending straight out from the funnel body 310 or formed in loops that extend outward. The number of fingers 332 comprising the funnel protrusion 330 may also vary. As shown in FIGS. 3A-3B, there may be six fingers 332; however, alternative aspects may have more or less fingers. The total width 338 that the funnel protrusion 330 extends along the funnel body 310 may also vary, but is generally at least wide enough to securely support container 100 moving onto an adjacent surface, like the conveyor belt.

Additionally, in some embodiments, the funnel protrusion 330 attached to the funnel body 310 is curved, or the fingers 332 attached to the funnel body 310 are arranged in a curved line to correspond to the curvature of the circular aperture 320. Having the funnel protrusion 330 provide a curved surface provides better support for transporting rounded containers 100, such as bottles or cans. Other embodiments may attach the funnel protrusion 330 or the fingers 332 to the funnel body 310 along a flat line to provide a flat surface for transporting the container 100.

Opposite the first side 312 of the funnel body 310 may be a second side 314 of the funnel body 310. The second side 314 may generally face a container 100 as it is being inserted through the aperture 320. The surface of the second side 314 of the funnel body 310 may be curved, as shown in FIGS. 3A and 3B, or may be flat. Similarly, the surface of the first side 312 of the funnel body 310 may be curved or may be flat.

Turning to FIGS. 4A-4B, a perspective view and a side view, respectively, of the funnel 330 with a conveyor belt 410, are shown. The funnel 300 and the conveyor belt 410 are oriented so that the first side 312 of the funnel body 310 is generally facing the conveyor belt 410. In this way, the funnel protrusion 330 (shown in the embodiment illustrated as the of fingers 332) is extending towards the conveyor belt 410 to provide a means of mechanically supporting container 100 onto the conveyor belt 410 from the funnel 330.

The conveyor belt 410 transports the container 100 after it is scanned. In some embodiments, the conveyor belt 410 comprises a single belt. In other embodiments, such as the one provided in FIGS. 4A-4B, the conveyor belt 410 is a split conveyor belt comprising two belts. The conveyor belt 410 may comprise two identical belts with a small gap between the two belts. The identical belts may be tilted such that the angle created between the two identical conveyor belts is less than 180 degrees. The conveyor belt 410 with two tilted belts may cradle a rounded container 100, such as a bottle or can, to prevent the container 100 from rolling off the belt.

In some systems, there may be a second conveyor belt positioned adjacent to the second side 314 on the side of the funnel 300. The second conveyor belt may be used to transport the container 100 to the funnel 300. In other embodiments, container 100 is transported to the funnel 300 by other means. For example, in reverse vending machines, container 100 may be inserted through the funnel 300 by a user. In this way, the funnel 300 may be considered an entry funnel as it is the entrance to the rest of the reverse vending machine.

The funnel body 310 is positioned at a first distance 420 from a first end 412 of the conveyor belt 410, and the funnel protrusion 330 (i.e., fingers 332) is positioned at a second distance 430 from the first end 412 of the conveyor belt 410. As the funnel protrusion 330 is positioned between the funnel body 310 and the conveyor belt 410, the first distance 420 is greater than the second distance 430.

The first distance 420 accounts for the length 480 of the funnel protrusion 330, or the fingers 332, and the gap 450 between the funnel protrusion 330 and the first end 412 of the conveyor belt. In the embodiment shown in FIG. 4B, the top edges 470 of the fingers 332 are shorter than the bottom edges 460 due to the curved surface of the funnel body 310 to which the fingers 332 are attached. For purposes of this description, the length 480 of the funnel protrusion 330 is based on the top edge 470. The first distance 420 must be sufficient to allow for reading of a ladder barcode moving from the funnel 300 to the conveyor belt 410. The optimal length for the first distance 420 is a function of several variables, which are discussed in detail with respect to FIGS. 5A-5B. The second distance 430 accounts for the length of the gap 450 between the funnel protrusion 330 and the conveyor belt 410. Accordingly, the second distance 430 is a part of the first distance 420. The second distance 430 may be a length sufficient to read a fence barcode.

Figure 2A:
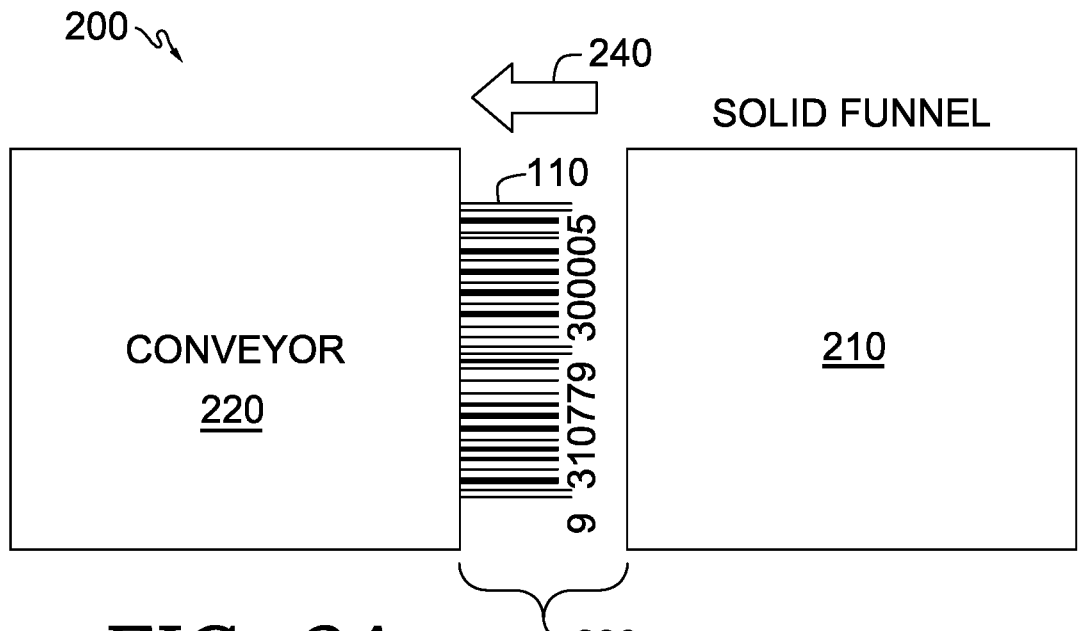
FIGS. 2A-2B are bottom views of a scanning system with a solid funnel of the prior art.
Figure 2B:
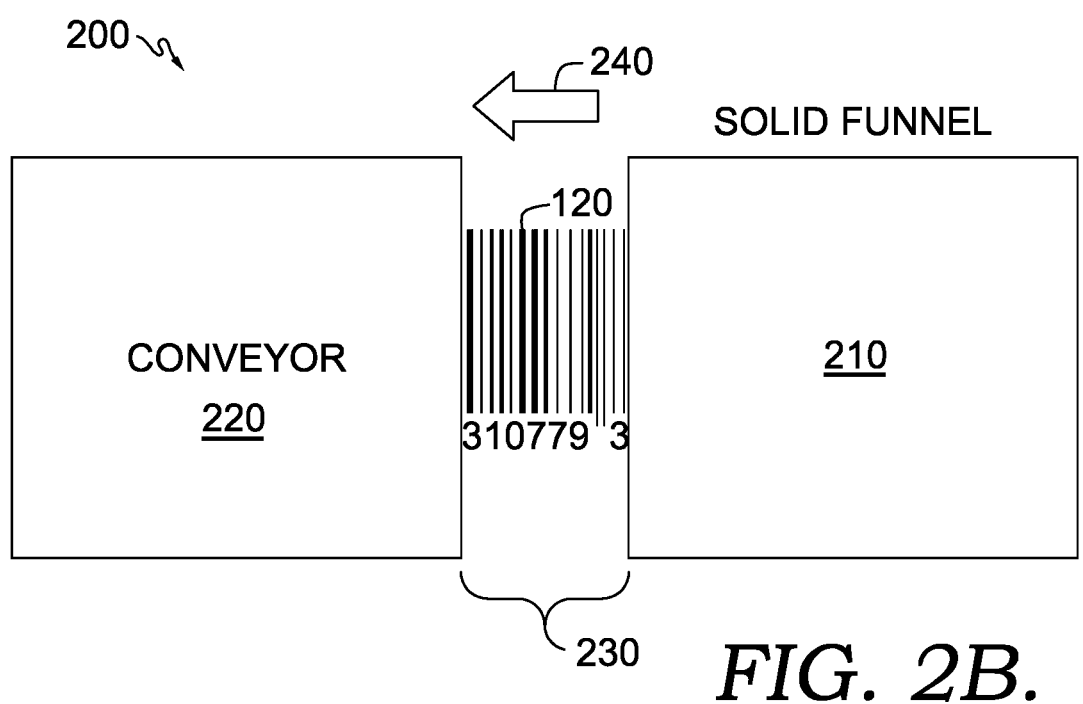
Figure 5A:
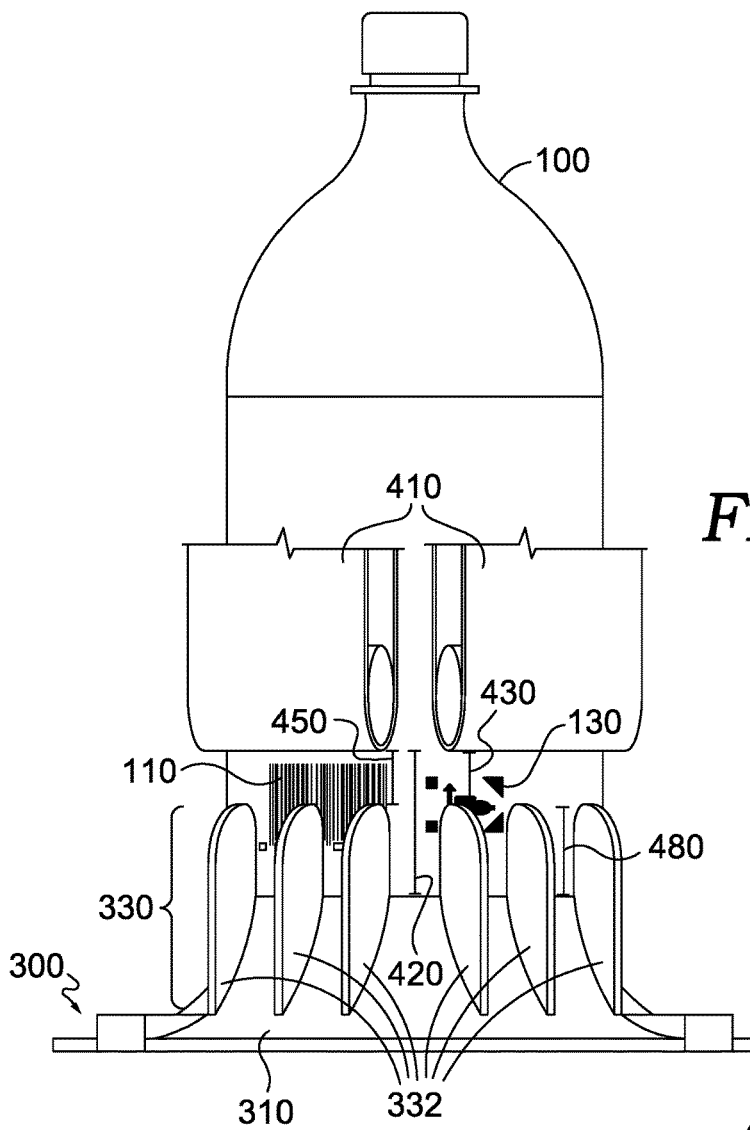
FIGS. 5A-5B are bottom views of a container with a fence barcode and a ladder barcode, respectively, moving across the funnel and conveyor belt of FIGS. 4A-4B in accordance with an embodiment of the present invention.
Figure 5B:
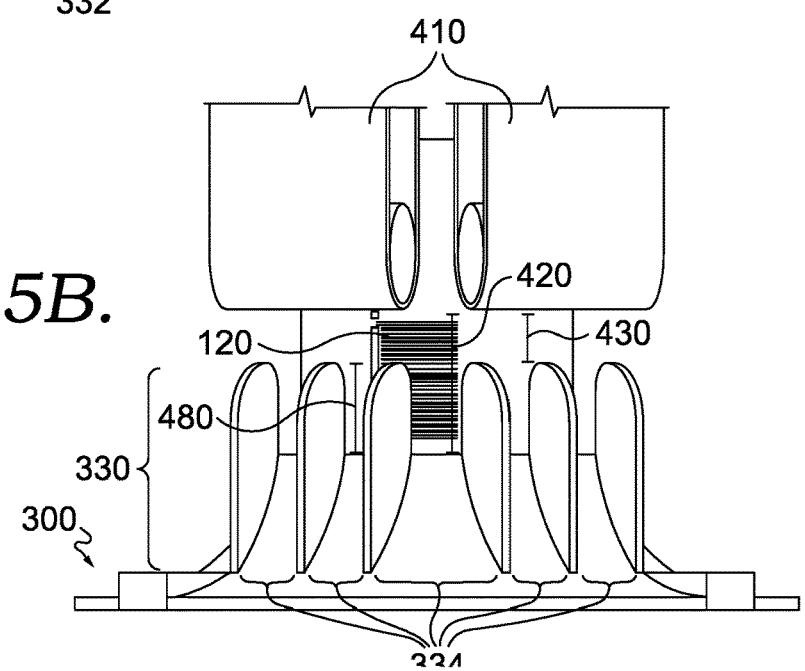

FIGS. 5A-5B provide bottom views of the container 100 having a fence barcode 110 and a ladder barcode 120, respectively, moving from the funnel 300 to a conveyor belt 410. When compared to the bottom views of the traditional system illustrated in FIGS. 2A-2B, the advantage of the disclosed system is apparent. A container 100 having a fence barcode 110 that is placed through the funnel 330 having a funnel protrusion 330, such as the fingers 332, is shown in FIG. 5A. As the container 100 moves over the fingers 332 to the conveyor belt 410, the fence barcode 110 is will be visible through at least the gap 450 between the fingers and the conveyor belt 410. Because the entire pattern of the fence barcode 110 is visible at one time, a camera can capture an image of the fence barcode 100 for processing and identification of the container 100.

The container 100 with a ladder barcode 120 moving over the funnel protrusion 330, or fingers 332, to the conveyor belt 410 is shown in FIG. 5B. Due to its vertical orientation, the entire pattern of the ladder barcode 120 is not visible through only the gap 450 between the funnel protrusion 330 and the conveyor belt 410. However, because the funnel protrusion 330 includes the fingers 3332 spaced apart, the entire pattern of the ladder barcode 120 is visible through the gap 450 and the spaces 334 between the fingers 332. Accordingly, the funnel protrusion 330 provides the necessary visual access to a ladder barcode 120 to allow for scanning while mechanically supporting the container 100 as it moves onto the conveyor belt 410. Though the ladder barcode 120 and fence barcode 110 shown are EAN-13 barcodes, the funnel 300 may be used to scan other types of barcodes, such as EAN-8 and UPC, barcodes. Additionally, the container 100 may be drink containers of variety of sizes and may be made various materials including glass, plastic, or metal. Other types of items may be used with the funnel 100.

Figure 6:
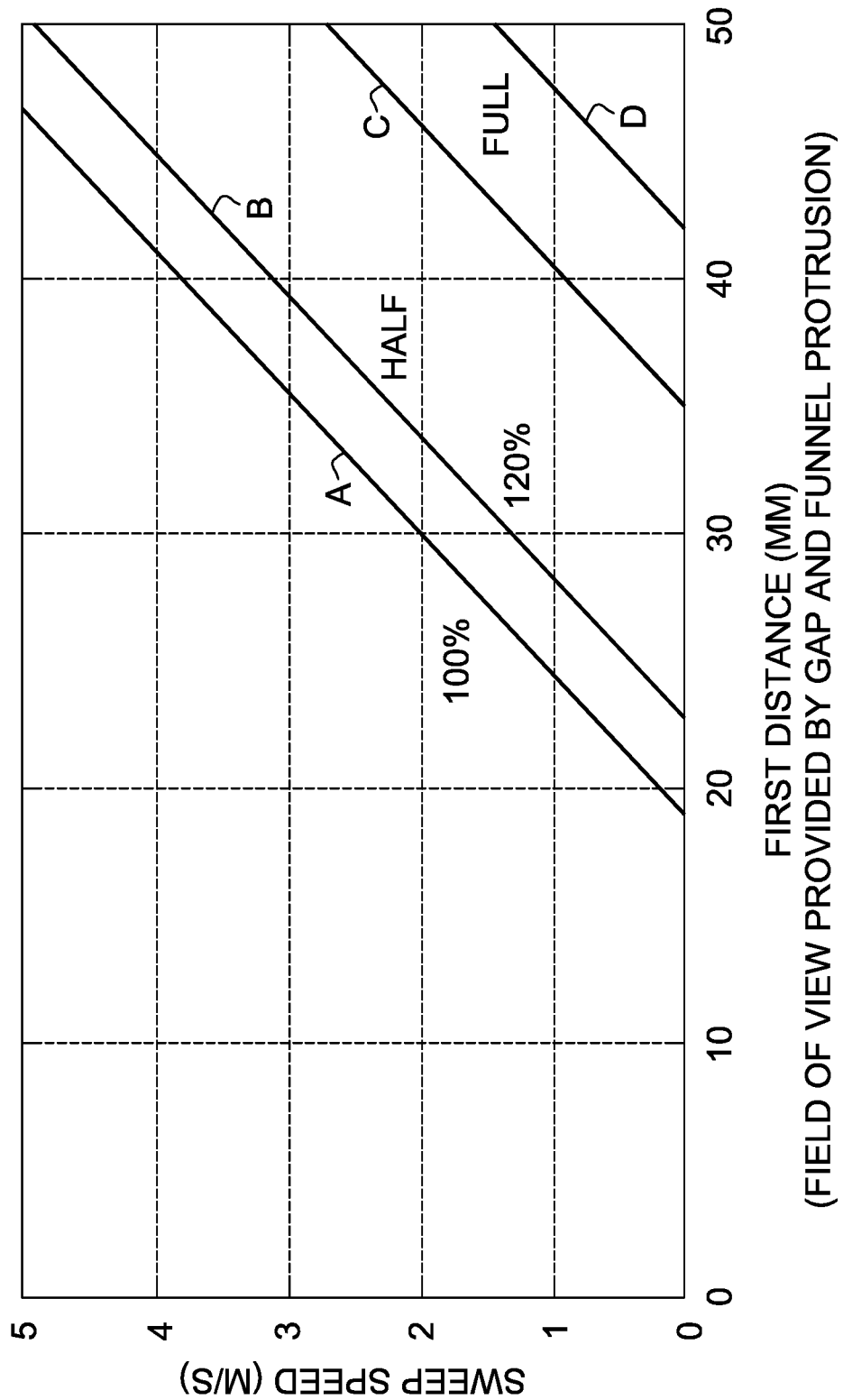
FIG. 6 is a graphical illustration of the relationship between the field of view for a bottom camera and the fastest possible sweep speed in accordance with an embodiment of the present invention.

As previously mentioned, the first distance 420 represents the gap 450 and the length 480 of the funnel protrusion 330. The first distance may range from 20 millimeters to 80 millimeters in different aspects. In exemplary aspects, the first distance 420 is a length that is sufficient to allow for reading of a ladder barcode 120. The sufficient length for the first distance 420 depends on multiple factors, including the sweep speed, the size of the ladder barcode 120, and the minimum length or segment of the ladder barcode 120 that must be captured in a single frame for an accurate reading, and the frame rate of the scanning camera. FIG. 6 provides a graph measuring the first distance 420 against sweep speeds for reading half of a 100% EAN-13 barcode (line A) and a 120% EAN-13 barcode (line B) and for reading a full 100% EAN-13 barcode (line C) and a full 120% EAN-13 barcode (line D). A 100% EAN barcode is a barcode that is 100% of the standard size of an EAN-13 barcode, and a 120% EAN-13 barcode is a barcode that is 120% the standard size of an EAN-13 barcode. As illustrated by the graph, smaller barcodes (100% versus 120%) and smaller minimum segments (half versus full) allow for a shorter first distance 420 and faster sweep speeds.

For example, a standard EAN-13 barcode is 35 millimeters long. To account for movement of the ladder barcode 120 across the field of view created by the funnel protrusion 330 and the gap 450, the first distance 430 must be greater than 35 millimeters to read a full 100% EAN-13 barcode as it is moving. Specifically, a first distance 420 of 50 millimeters may capture an image of a full 100% EAN-13 ladder barcode 120 moving at approximately 2.7 meters per second. But a first distance 420 of 40 millimeters can capture half of a 100% EAN-13 ladder barcode 120 with a sweep speed of approximately 3.8 meters per second. In exemplary aspects, the first distance is 30 millimeters, which allows for imaging half of a 100% EAN-13 barcode at approximately 2.0 meters per second and half of a 120% EAN-13 barcode at approximately 1.3 meters per second.

While the first distance 420 is determined by the length 480 of the funnel protrusion 330 and the gap 450 between the funnel protrusion 330 and the conveyor belt 410, the second distance 430 accounts for only the length of the gap 450. In exemplary aspects, a downward-facing fence barcode 110 on a container 100 will be imaged through the gap 450. Because a fence barcode 110 is read horizontally, the full pattern of a fence barcode 110 may be imaged at once through a relatively small gap 450. Accordingly, the second distance 430 may be a small distance, such as 5 millimeters, but may be greater. For instance, in some aspects, the gap 450 may be used to capture an image of a security feature, such as a DPG logo 130. In this case, the second distance 430 may be defined by the length necessary to capture the DPG logo 130. In exemplary aspects, the second distance 430 is 20 millimeters and is sufficient to capture an image of a fence barcode 110 as well as the DPG logo 130.

Considering the variables for an optimal first distance 420 and second distance 430, in an exemplary aspect of the high-speed scanning system, the first distance 420 is 50 millimeters, and the second distance 430 is 20 millimeters. In this case, the funnel protrusion 330 would have a length 480 of 30 millimeters and be positioned 20 millimeters from the conveyor belt 410. In another embodiment, the first distance 420 is 30 millimeters while the second distance 430 is 20 millimeters. Here, the length 480 of the funnel protrusion 330 would be 10 millimeters, and the funnel protrusion 330 would be positioned 20 millimeters from the conveyor belt 410.

FIG. 7 provides a bottom view of another embodiment of the funnel 300 for transporting a container 100 to a conveyor belt 410 while providing visual access to a downward-facing ladder barcode 120 on the container 100. Here, the funnel protrusion 330 comprises a solid piece constructed from transparent material. Though this funnel protrusion 330 does not have fingers providing empty spaces, the entire pattern of the ladder barcode 120 is visible through the gap 450 and through the transparent funnel protrusion 330 itself. An alternative aspect includes a funnel protrusion 330 comprising a plurality of fingers (similar to the fingers 332 shown in FIGS. 3A-3B) that are made from transparent material.

Figure 8:
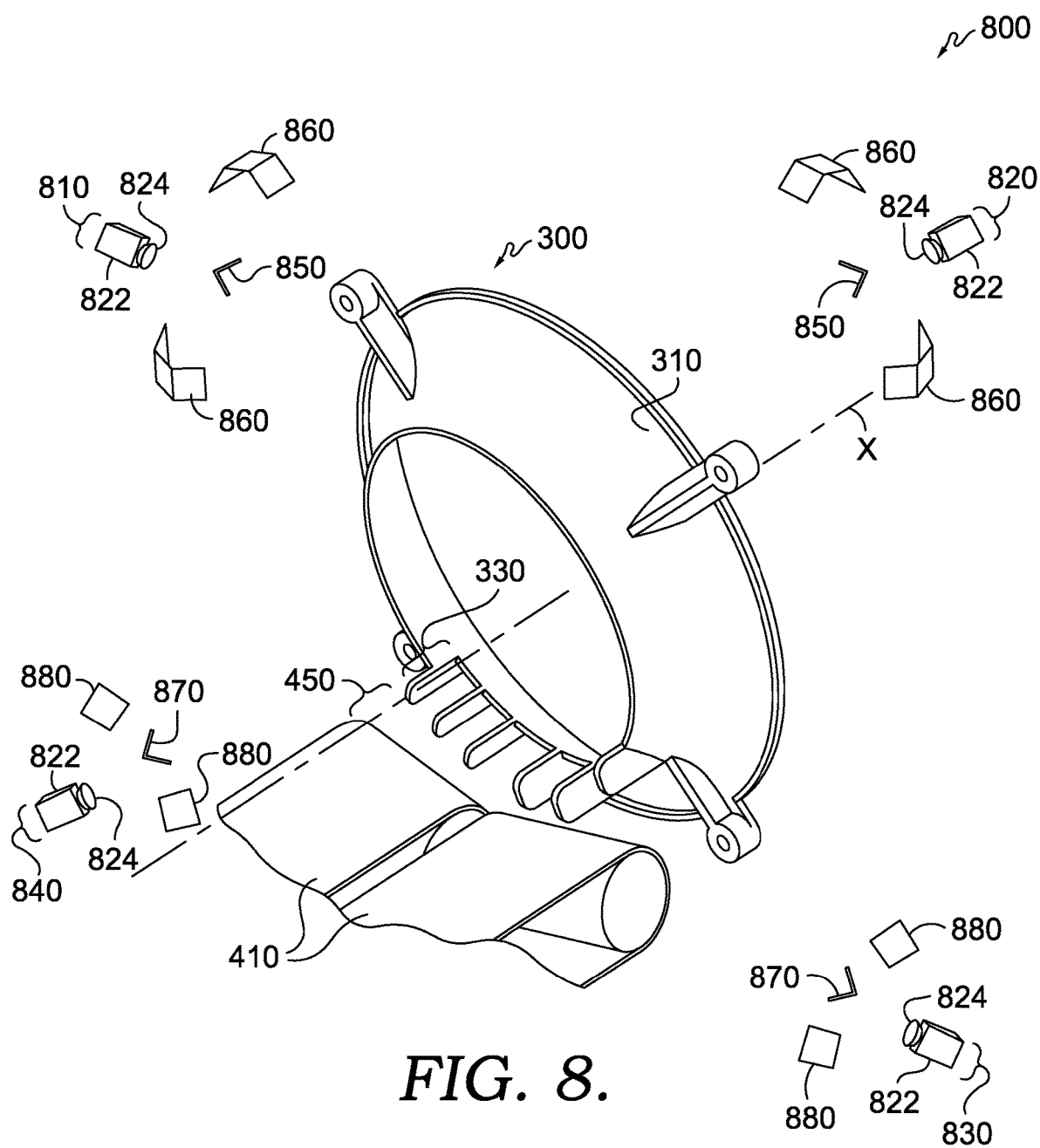
FIG. 8 is a perspective view of a camera system positioned around the funnel and conveyor belt of FIGS. 4A-4B in accordance with an embodiment of the present invention.

In addition to the conveyor belt 410, the funnel 300 may also be used with a camera system 800 to scan the barcodes, which is shown in FIG. 8. The camera system 800 may comprise a plurality of cameras configured to capture an image of a barcode on a container 100. In exemplary embodiments, the camera system 800 provides a 360-degree view around axis X shown in FIG. 8. A camera system 800 with a 360-degree view around axis X has a 360-degree view of a container being moved from the funnel 300 to the conveyor belt 410. In this way, the camera system 800 can read or scan a barcode regardless of the orientation of the barcode with respect to a single camera. In other words, at least one camera can image the barcode regardless of which direction the barcode is facing when the container is placed through the funnel. For example, cameras positioned above the conveyor belt 410 may have a view of a barcode facing upward on a container that is moving between the funnel 300 and the conveyor belt 410, while cameras positioned below the conveyor belt 410 may have a view of a downward facing barcode through the funnel protrusion 330 and through the gap 450 between the funnel protrusion 330 and the conveyor belt 410.

Embodiments obtain the 360-degree view through various camera configurations. For example, in one embodiment, the camera system 800 comprises six cameras evenly spaced around the funnel 300. The six cameras may be positioned so that each camera has a separate 60-degree view. In some embodiments, the view volumes of the cameras, or the three-dimensional space that each camera views, may intersect in proximity to the container such that the cameras have partially overlapping views. Additionally, more than six cameras may be used in the camera system 800.

In other embodiments, the camera system 800 comprises less than six cameras. For example, in the exemplary aspect illustrated in FIG. 8, the camera system 800 comprises four cameras 810, 820, 830, and 840, which includes two top cameras 810 and 820 and two bottom cameras 830 and 840. Each of the cameras 810, 820, 830 840 may include an imager 822 and lens 824.

To obtain a 360-degree view of a container 100 moving from the funnel 300 to the conveyor belt 410, the cameras 810, 820, 830, and 840 in this four-camera system 800 may have wide angle lenses and be positioned farther away from the container. Alternatively, the camera system 800 may include one or more mirrors to capture different perspectives as shown in FIG. 8. In exemplary embodiments, the camera system 800 includes a plurality of splitting mirrors and redirecting mirrors. In the camera system 800 provided in FIG. 8, there is a splitting mirror 850 for each top camera 810 and 820 and a splitting mirror 870 for each bottom camera 830 and 840 to provide each camera 810, 820, 830, and 840 with two views. Additionally, there may at least one redirecting mirror 860 for each view associated with the top cameras 810 and 820 and at least one redirecting mirror 880 for each view associated with the bottom cameras 830 and 840. A method of using splitting mirrors obtain different perspectives of an item for scanning is described in U.S. Pat. No. 8,353,457 issued to Applicant, which is incorporated in its entirety by reference.

Figure 9A:
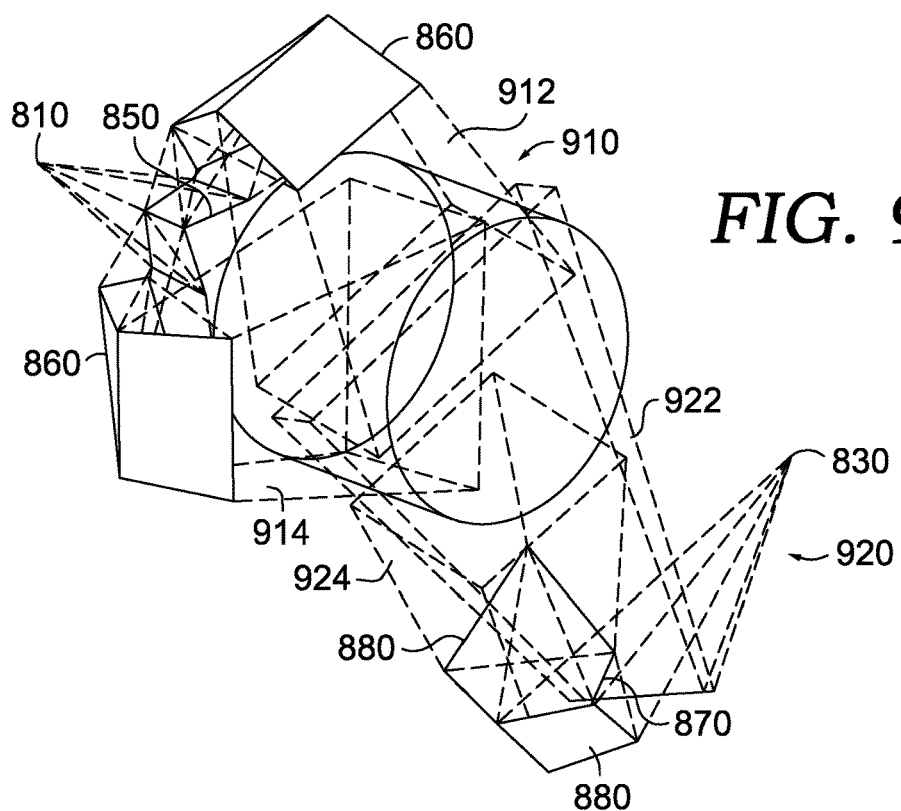
FIG. 9A-9B are perspective and front views of the camera system of FIG. 8 in accordance with an embodiment of the present invention.
Figure 9B:
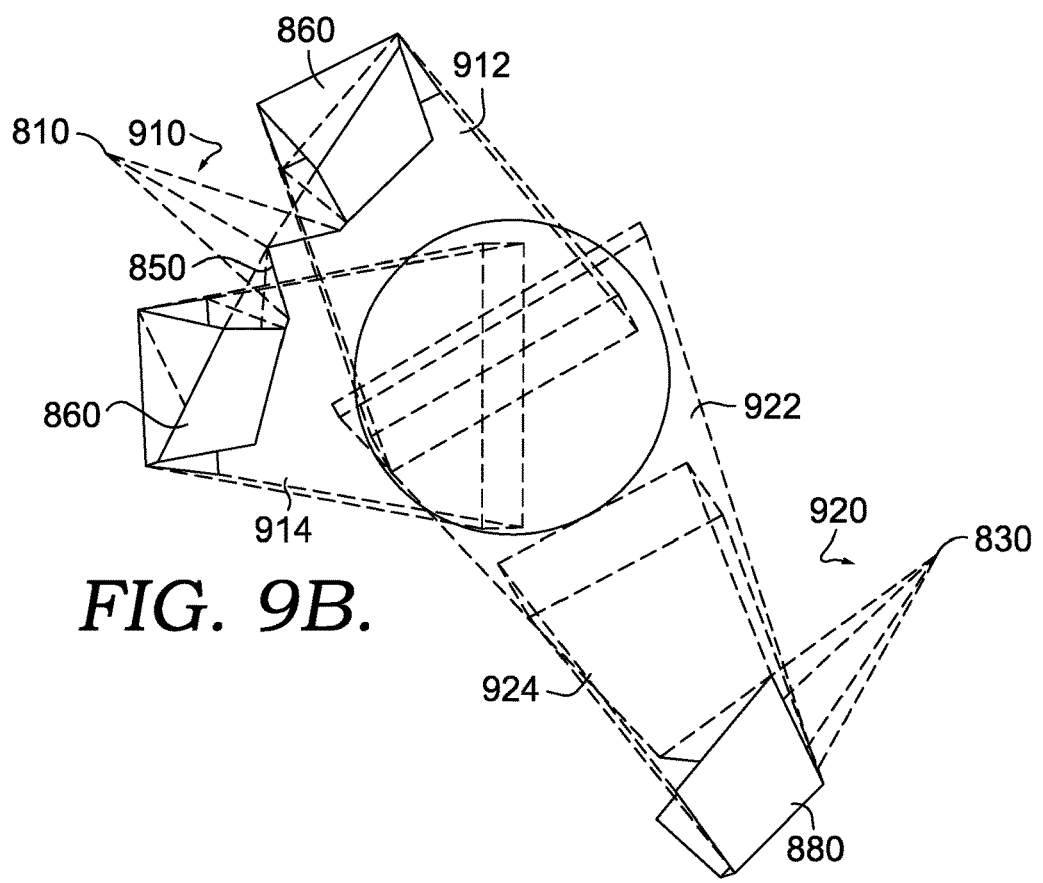

FIG. 9A-9B illustrates the different views provided by the camera system. For purposes of clarity, the views for only top camera 810 and bottom camera 830 are shown but they are each representative of the views for top camera 820 and bottom camera 840, respectively. Looking to the top camera 810, the view volume 910 for the top camera 810 is shown. The line of sight for top camera 810 corresponds to the view volume 910. The line of sight originates at the camera 810 and is reflected off of the splitting mirror 850. The splitting mirror 850 comprises two mirrored faces joined at an angle. The angle may be less than 180 degrees such that the line of sight splits into two separate views 912 and 914. Views 912 and 914 may be separated by 60 degrees.

After reflecting off of the splitting mirror 850, the line of sight for top camera 810 may be directed away from funnel 300 and conveyor belt 410 that would be situated in the middle of the camera system 800. Accordingly, each view 912 and 914 may be redirected towards the middle of the camera system 800 by redirecting mirrors 860. In one aspect, the redirecting mirrors 860 each comprise three reflective mirror panes. Upon reflecting off of the redirecting mirrors 860, the line of sight for the top camera 810 extends towards the funnel 300 and the conveyor belt 410.

Turning to the bottom camera 830, the bottom camera 830 is positioned so that the view volume 920 for the bottom camera 830 includes at least the part of the gap 450 and the funnel protrusion 330 (not shown in FIGS. 9A-9B). In some embodiments, the bottom camera 830 positioned to the right of the conveyor belt 410 may be aimed at imaging the right half of the gap 450 and funnel protrusion 330, while the bottom camera 840 positioned to the left of the conveyor belt 410 may capture the left portion. The splitting mirror 870 for the bottom mirror 830 may split the view 900 into views 922 and 924 having different orientations. Unlike with the splitting mirror 850 used for the top camera 810, the splitting mirror 870 for the bottom camera 830 does not add a separate view but provides two images of the same area, with one view being rotated 90 degrees. By rotating one view 90 degrees, the bottom camera 830 is configured to read both fence barcodes 110 and ladder barcodes 120. Like the with top camera, the line of sight for the bottom camera 830 may need to be redirected towards the center of the camera system 800 after reflecting off of the splitting mirror 870. Accordingly, a redirecting mirror 880 may be used for each view 922 and 924 of the bottom camera 830.

Each camera 810, 820, 830, and 840 in the camera system 800 may take multiple pictures per frame. For purposes of this description, a frame consists of a sequence of data capturing or imaging events. For example, each top camera 810 and 820 may take two images per frame. The first top image may be an infrared picture taken under infrared light. The infrared picture may be used to detect a DPG logo or other security measure printed on the container. Infrared light has a wavelength between approximately 700 nanometers to 1 millimeter. In exemplary embodiments, the infrared light used has a wavelength of approximately 940 nanometers. Because the DPG logo looks different under visible light compared to infrared light, a second top image may be taken under visible light, including red light or blue light, to authenticate a DPG logo. The second top image may also capture an image of a fence barcode or ladder barcode. To achieve these different images, the camera system 800 may be programmed to switch the desired light sources—between infrared and visible light for example—automatically.

The bottom cameras 830 and 840 may each take three images per frame. Like the first top image, the first bottom image may include an image taken with infrared light for detecting a DPG logo. A second bottom image may be taken under a visible light to authenticate the DPG logo and to capture an image of a fence barcode if one is included on the container. Lastly, a third bottom image may capture a ladder barcode if the container has a ladder barcode. This third bottom image may be rotated 90 degrees compared to the second bottom image. While a ladder barcode may be captured in the second bottom image, using an image rotated 90 degrees for the ladder barcode allows the ladder barcode to be read horizontally like a fence barcode, making it easier to process the image and read the ladder barcode. This third bottom image and the second bottom image may be parts of a single picture taken. For example, each bottom camera 430 and 440 may take only one picture in visible light but, because by using a splitting mirror, that image taken in visible light includes a visible light image for reading fence barcodes and DPG logos, i.e., the second bottom image, and an image for reading ladder barcodes, i.e., the third bottom image.

Figure 10:
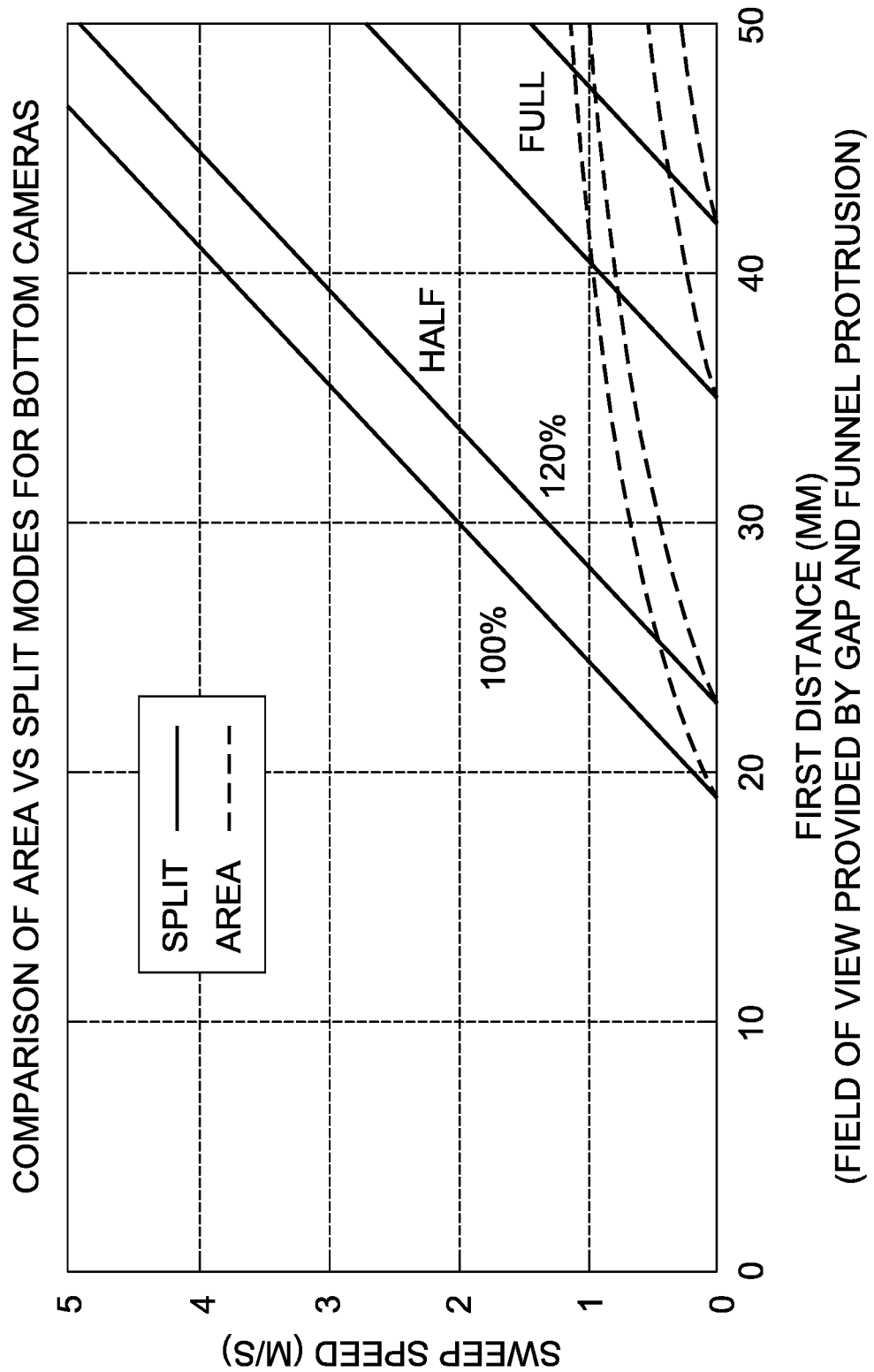
FIG. 10 is a graphical illustration of the comparison between area mode cameras and split mode cameras in accordance with an embodiment of the present invention.

By using splitting mirrors for the bottom cameras 830 and 840 to provide different views for reading ladder barcodes and fence barcodes, higher sweep speeds may be used, as shown in the graph provided by FIG. 10. The graph in FIG. 10 is similar to the graph provided in FIG. 6 in that it measures the first distance against sweep speed for different sizes of barcodes and different amounts of the barcode that must be imaged, but FIG. 10 also shows the difference between using bottom cameras 830 and 840 operating in a split mode, such as the ones described above, and cameras operating in an area mode. An area mode would use the same image for reading both fence barcodes and ladder barcodes. While, in both modes, sweep speed increases with the first distance, the incremental increase is greater for split mode cameras, shown in the solid lines, than for area mode cameras, shown in dashed lines.

Another factor affecting sweep speed is the frame rate, which may be different for the top cameras 810 and 820 and the bottom cameras 830 and 840. Because the top cameras 810 and 820 have a larger field of view compared to the bottom cameras 830 and 840, which are limited to the field of view defined by the gap 450 and the funnel protrusion 330, the top cameras 810 and 820 may use a lower frame rate. For example, the top cameras 810 and 820 may run at a frame rate between 20 frames per second and 50 frames per second, and the bottom cameras may run at a frame rate between 80 frames per second and 200 frames per second. In exemplary aspects, the frame rate for the top cameras 810 and 820 is 30 frames per second while the frame rate for the bottom cameras 830 and 820 is 180 frames per second.

Using cameras with higher frame rates also provides an advantage for fraud detection. It can be problematic when a user of a reverse vending machine inserts a container to get the barcode scanned and then quickly removes the container to use for additional scans to increase the payout. High frame rates capture reverse movement of containers even at high speeds, and a processor may be able to identify the reverse movement as a potential fraudulent transaction.

In an alternative embodiment, the camera system may comprise four cameras 810, 820, 830, and 840 but not include mirrors for the bottom cameras 830 and 840. Instead, one bottom camera, such as camera 830, may take images only for purposes of capturing fence barcodes 110 and DPG logos 130, if any, while the other bottom camera, such as 840, may take images only for purposes of capturing ladder barcodes 120. The bottom camera 840 configured to capture the ladder barcode 120 may be rotated at a 90 degree angle compared to the bottom camera 830 configured to capture fence barcodes 110 such that an image of a ladder barcode from the bottom camera 840 could automatically be read horizontally. Alternatively, the image of the ladder barcode from the bottom camera 840 may be rotated 90 degrees during processing before the barcode is read.

In another embodiment, the camera system 800 comprises three cameras. One camera may be positioned directly above the conveyor belt, one camera may be positioned slightly below and to the right of the conveyor belt 410, and a third camera may be positioned slightly below and to the left of the conveyor belt 410. The cameras in this three-camera system may also comprise a plurality of mirrors so that each camera has two views.

Figure 11:
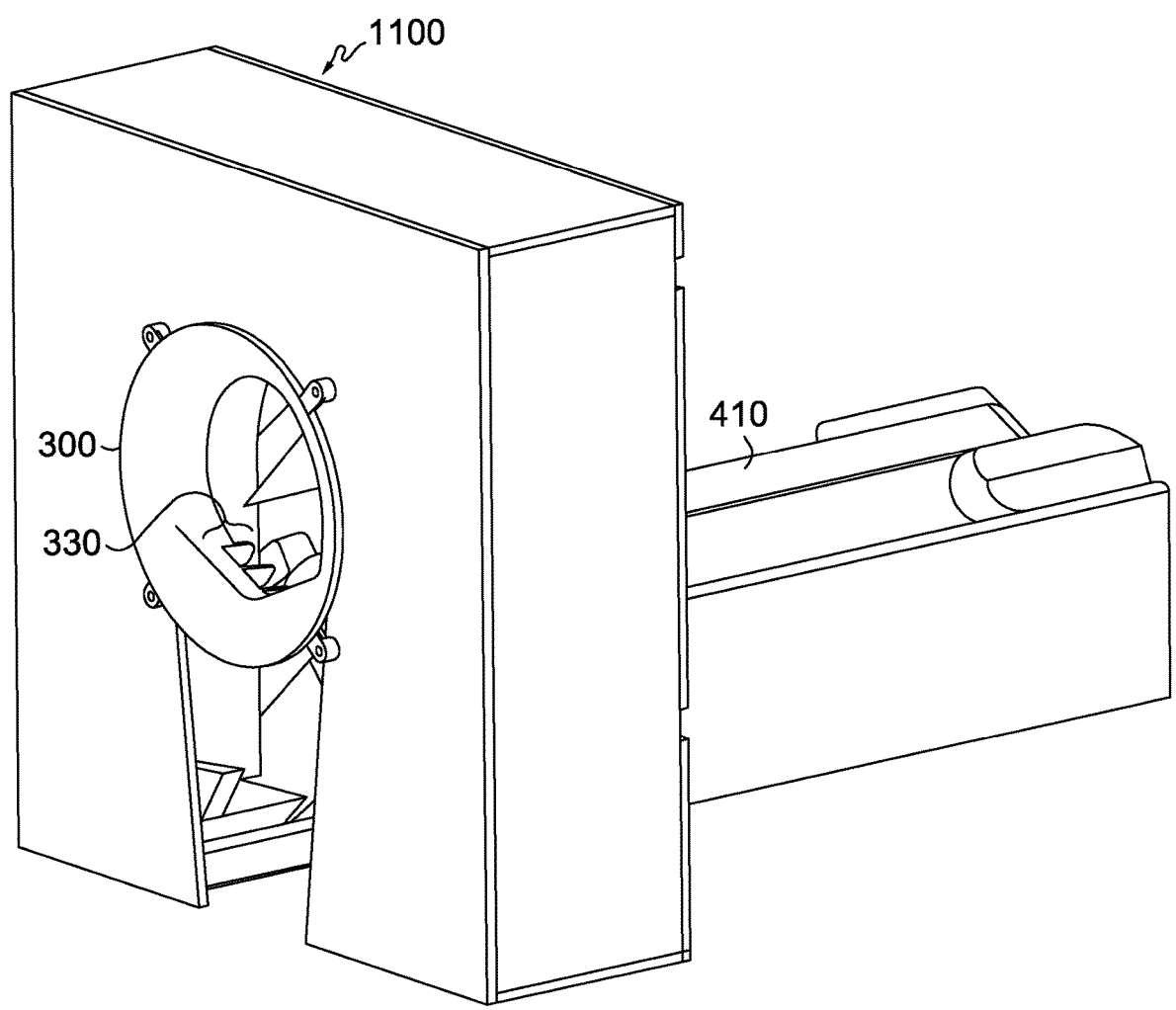
FIG. 11 is a perspective view of a housing for the camera system of FIG. 8 with the funnel and conveyor belt of FIGS. 4A-4B in accordance with an embodiment of the present invention.

The camera system 800 may be enclosed in a housing unit 1100. FIG. 11 shows an exemplary embodiment of a housing unit 1100. The funnel 300 is embedded within the housing unit 1100 and positioned adjacent to a conveyor belt 410. In this embodiment, the housing unit 1100 has a horse-shoe shape, meaning it has a circular top portion that extends into two parallel side portions and is open underneath the funnel 300. This shape can accommodate the camera system 800 while keeping an open area underneath the conveyor belt 410 and funnel 300. An open bottom for the housing unit 1100 allows for easier cleaning, which may be particularly useful in a reverse vending machine because residual content from the containers 100 may drip underneath the conveyor belt 410 and funnel 300. The shape of the funnel 300 may correspond to a portion of the housing unit 1100. In FIG. 11, the funnel 300 is circular and corresponds to the circular upper portion of the housing unit 100. The housing unit 1100 and the funnel 300 may comprise other shapes in different embodiments.

The housing unit 1100 may also be designed to help with performance of the camera system 800. For example, in exemplary embodiments, the housing unit 1100 protects the camera system 800 from ambient light such that the camera system 800 may be employed in a device operating in sunlight without the light affecting the images. Ambient light sensitivity may be also limited with the use of pulsed illumination and a short exposure time.

After the images are captured by the cameras 810, 820, 830, and 840, the images must be processed. Image processing may include determining which portion of the images to read, reading the images at a particular resolution, stitching together barcode segments from different images, and decoding or reading the barcode pattern. Image processing may be performed by an image processor. The image processor may be physically located near the camera system or may be part of a remote computer connected to the cameras through a network.

One of the first processing steps may include determining what parts of the images will be further processed or read. The particular portion of the image that is read depends on what the camera system is designed to capture with that image. For example, the second bottom images from the bottom cameras 830 and 840 may be used to capture a fence barcode and a DPG label. Because the fence barcode and the DPG label may be read through the gap 450, only the portion of the second bottom image comprising the gap 450 is read even though the field of view includes at least the gap 450 and the funnel protrusion 330. Similarly, the third bottom images from the bottom cameras 830 and 840 may be used to capture a ladder barcode, which may be read through the gap 450 and the funnel protrusion 330. Where the funnel protrusion 330 includes fingers 332, the ladder barcode is really captured through part of the gap 450 and the spaces 334 between the fingers 332. Thus, only the portion of the third top image that includes the part of the gap 450 and the spaces 33 between the fingers 332 may be read.

Additionally, only certain rows in an image may be read or further processed, creating images with lower resolutions. Reducing the number of rows that are read allows for higher frame rates. At the same time, because the barcodes are read horizontally, or in a direction parallel to rows, reducing the number of rows does not prevent the barcodes from being read. Accordingly, the cameras 810, 820, 830, and 840 may produce images of lower resolutions by reader fewer rows in order to run at a higher frame rate.

The first top image captured by the top cameras 810 and 820 may be taken at a lower resolution than the second top image to increase the frame rate. In exemplary embodiments, 256 rows of the first top image (the infrared image) are read while 768 lines the second top image (the visible light image) are read. Further, in exemplary embodiments, the third bottom image (the rotated visible light image for ladder barcodes) has a lower resolution than the other bottom images. For example, the 64 rows from the first bottom image (the infrared image) and the second bottom image (visible light image for fence barcodes) are read while only 24 rows are read from the third bottom image. As previously mentioned, the ladder barcode is read from the third bottom image that is rotated 90 degrees, which allows the ladder barcode to be read horizontally. In this embodiment, the bottom cameras can operate at 180 frames per second due to the number of rows being read for each of the images. Increasing the frame rate allows for a higher sweep speed while maintaining a small field of view created by the gap 450 and the funnel protrusion 330.

Processing images may further include stitching, which is the process of combining partial portions of a barcode to form a complete code. Capturing only a portion of a barcode in a single frame increases the possible sweep speed. As a ladder barcode moves across the field of view, different segments of the barcode appear sequentially within the field of view. When multiple portions of the barcode are imaged, they can still be decoded after a full barcode is stitched together from multiple segments or pieces. The efficiency and accuracy of the stitching process increases when more digits are captured in each segment and when there is more overlap of digits in successive segments.

Lastly, image processing may include decoding the pattern of the barcode and determining identifying information about the container 100. Identification information may include the type of material from which the container 100 is made and whether the returning the container 100 entitles a user to a deposit.

Figure 12:
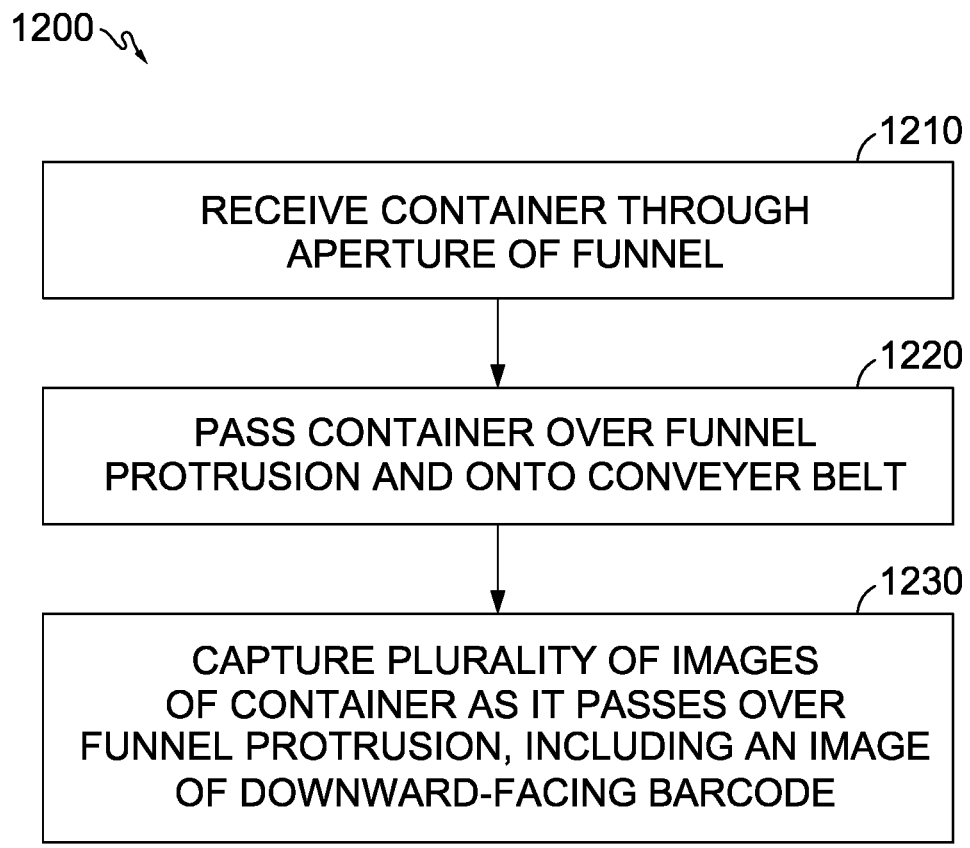
FIG. 12 is a flow diagram of a method of scanning bottom-facing barcodes at a high speed.

Turning to FIG. 12, a flow diagram describing a method 1200 of scanning one or more barcodes on a container is provided. First, at step 1210, the container is received through an aperture of a funnel body. At step 1220, the item is passed over a funnel protrusion that extends from a bottom portion of the funnel body and onto a conveyor belt. A portion of the container may be visible from below the funnel protrusion when the container passes over the funnel protrusion. In some embodiments, the funnel protrusion comprises a plurality of spaced fingers, thereby providing optical access to the container from below the funnel protrusion. Next, at step 1230, a plurality of images of the container passing over the funnel protrusion are captured. At least one of the images has a barcode of the container that is generally facing towards the funnel protrusion. In some embodiment, the method further comprises processing the images. Processing the images may include detecting at least a portion of a barcode on an image and stitching multiple images with segments of a barcode. Lastly, the full barcode may be read to collect data about the container. The data may include the type of material from which the container is made. Processing may also include comparing an infrared picture and a visible light picture to detect and authenticate a DPG logo.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

What is claimed is:

1. A high-speed scanning system comprising:
   a conveyor belt for transporting one or more items each having at least one barcode;

a funnel configured to provide the one or more items to an end of the conveyor belt, the funnel comprising a funnel body having an aperture and a funnel protrusion including a plurality of fingers spaced apart and extending along at least a segment of the funnel body, wherein the funnel body is positioned at a first distance from the end of the conveyor belt and the funnel protrusion is positioned at a second distance from the end of the conveyor belt, the first distance being greater than the second distance, and wherein at least a portion of the one or more items are visible from below the funnel protrusion when the one or more items pass over the funnel protrusion to the conveyor belt;

a camera system positioned to capture one or more images of the one or more items when the one or more items pass over the funnel protrusion toward the end of the conveyor belt; and an image processor operable to read the at least one barcode from the one or more images.

2. The high-speed scanning system of claim 1, wherein the at least one barcode is a ladder barcode or a fence barcode.

3. The high-speed scanning system of claim 1, wherein the first distance between the funnel body and the end of the conveyor belt is 30 mm and the second distance between the funnel body and the end of the conveyor belt is 20 mm.

4. The high-speed scanning system of claim 1, wherein the segment of the funnel body along which the funnel protrusion extends is positioned beneath the aperture.

5. The high-speed scanning system of claim 1, wherein the funnel protrusion is constructed from a transparent material.

6. The high-speed scanning system of claim 1, wherein the plurality of fingers are evenly spaced.

7. The high-speed scanning system of claim 1, wherein the camera system comprises at least two top cameras and at least two bottom cameras.

8. The high-speed scanning system of claim 7, wherein the at least two bottom cameras comprise a first bottom camera and a second bottom camera, wherein the first bottom camera is positioned to take an image of a fence barcode as the one or more items pass over the gap between the funnel protrusion and end of the conveyor belt and the second bottom camera is positioned to take an image of a ladder barcode as the one or more items pass over the funnel protrusion and the gap.

9. The high-speed scanning system of claim 7, wherein the camera system further comprises a plurality of mirrors arranged such that each of the at least two top cameras and each of the at least two bottom cameras have a split view.

10. The high-speed scanning system of claim 9, wherein the at least two top cameras, the at least two bottom cameras, and the plurality of mirrors are positioned around the funnel such that the camera system has at least a 360-degree view of the one or more items passing over the funnel protrusion and onto the conveyor belt.

11. The high-speed camera system of claim 7, wherein each of the at least two bottom cameras have a two views of the funnel protrusion and the a gap between the funnel protrusion, wherein one view is rotated 90 degrees.

12. The high-speed scanning system of claim 7, wherein the at least two top cameras each capture per frame an image in infrared light and an image in visible light.

13. The high-speed scanning system of claim 7, wherein the at least two top cameras operate at 30 frames per second.

14. The high-speed scanning system of claim 7, wherein the at least two bottom cameras each capture per frame an image infrared light and at least two images in visible light.

15. The high-speed scanning system of claim 7, wherein the at least two bottom cameras operate at 180 frames per second.

16. The high-speed scanning system of claim 1, wherein the plurality of fingers are formed in loops that extend outward from the funnel body.

17. The high-speed scanning system of claim 1, wherein the plurality of fingers comprise at least one of metal rods, plastic rods, or metal wires extending out from the funnel body.

18. The high-speed scanning system of claim 1, wherein the plurality of fingers are arranged in a curved line along the funnel body.

19. The high-speed scanning system of claim 1, wherein the plurality of fingers are arranged in a flat line along the funnel body.

20. A device for allowing bottom scanning of barcode labels, the device comprising:

a funnel body having an annular shape with an aperture configured to receive one or more items having at least one barcode, wherein the funnel body has a first side configured to be positioned proximate to a conveyor belt and a second side generally opposite the first side; and funnel protrusions including a plurality of fingers spaced apart and extending from a bottom portion of the first side of the funnel body, wherein the funnel protrusions are configured to carry the one or more items to the conveyor belt and provide a view of the at least one barcode to a camera positioned generally below the funnel protrusions when the one or more items pass over the funnel protrusions to the conveyor belt.

21. The device of claim 20, wherein the plurality of fingers are evenly spaced.

22. The device of claim 20, wherein the plurality of fingers extend outward from the bottom portion of the first side of the funnel body.

23. The device of claim 20, wherein a length that the plurality of fingers extend outward from the funnel body is approximately 10 millimeters.

24. A method of scanning a barcode on an item, the method comprising:

receiving the item through an aperture of a funnel body;

passing the item over a funnel protrusion that is extending from at least a bottom portion of the funnel body and onto a conveyor belt, wherein the funnel protrusion comprises a plurality of fingers spaced apart from each other and at least a portion of the item is visible from below the funnel protrusion when the item passes over the funnel protrusion to the conveyor belt; and capturing a plurality of images of the item as it passes over the funnel protrusion, wherein at least one image is of the barcode on the item and wherein the barcode is generally facing towards the funnel protrusion.

25. The method of claim 24, wherein the funnel protrusion is constructed from a transparent material.

26. The method of claim 24, wherein the plurality of fingers are evenly spaced.

27. The method of claim 24 further comprising processing the plurality of images as a way to read the one or more barcodes on the item.

28. The method of claim 27, wherein processing the images includes stitching together a plurality of barcode segments taken from multiple images.

29. The method of claim 24, wherein passing the item over the funnel protrusion comprises passing the item over the funnel protrusion at a rate between approximately 1.5 meters per second and 2.0 meters per second.

* * * * *